United States Patent
Klein et al.

(10) Patent No.: US 8,239,940 B2
(45) Date of Patent: Aug. 7, 2012

(54) FUNCTIONAL PATCHING/HOOKING DETECTION AND PREVENTION

(75) Inventors: Amit Klein, Herzliya (IL); Oleg Izmerly, Ramat Gan (IL); Shmuel Regev, Tel Aviv (IL); Eldan Ben-Haim, Tel Aviv (IL)

(73) Assignee: Trusteer Ltd., Tel Aviv (IL)

( * ) Notice: Subject to any disclaimer, the term of this patent is extended or adjusted under 35 U.S.C. 154(b) by 310 days.

(21) Appl. No.: 12/537,893

(22) Filed: Aug. 7, 2009

(65) Prior Publication Data

US 2010/0169969 A1 Jul. 1, 2010

Related U.S. Application Data

(60) Provisional application No. 61/140,857, filed on Dec. 25, 2008.

(51) Int. Cl.
*G06F 11/00* (2006.01)

(52) U.S. Cl. .......................................................... 726/22
(58) Field of Classification Search ...................... 726/22
See application file for complete search history.

(56) References Cited

U.S. PATENT DOCUMENTS

| 2003/0182431 A1* | 9/2003 | Sturniolo et al. ............. 709/227 |
| 2005/0149726 A1* | 7/2005 | Joshi et al. ..................... 713/164 |

\* cited by examiner

*Primary Examiner* — Jacob Lipman
(74) *Attorney, Agent, or Firm* — Merchant & Gould P.C.

(57) ABSTRACT

A method for preventing malicious attacks on software, using the patching method, includes providing a database of legitimate and known patches, the database contains characteristic code paths of said legitimate patches. The method also includes detecting whether a patch is malicious by inspecting one or more characteristic paths of the patch and matching one or more code paths against the database of legitimate and known patches. An activity needed to prevent the malicious patch from performing undesired activities is then performed.

10 Claims, No Drawings

FUNCTIONAL PATCHING/HOOKING DETECTION AND PREVENTION

This application claims benefit of Ser. No. 61/140,857, filed 25 Dec. 2008 in the United States of America and which application is incorporated herein by reference. To the extent appropriate, a claim of priority is made to the above disclosed application.

FIELD OF THE INVENTION

The present invention relates to the detection and/or the prevention of functional patching.

BACKGROUND OF THE INVENTION

Software modules interact by exporting a list of functions (API) by one module, and calling this API by another module. Thus, a program written by vendor A can load a library/module (possibly provided by another vendor, vendor B) that provides services to the main program. Both the program and the library are typically provided to the user in binary form (i.e. without the source code). The user may want to modify the way in which the software works, but the source code may not be available. Still, by knowing the API exported by the library, the user can interject its own code between the main program and the library. This is done by a technique called "patching" (or "hooking"). There are several variants, but the essence is that a user code can be run before, instead or after any function exported by the library (and invoked by the main program).

The aforementioned patching or hooking technique has many legitimate uses, such as debugging, tweaking (e.g. add security checks, add Y2K checks, or other checks), etc. On the other hand, it is a very effective way to maliciously modify the manner in which legitimate browsing software behaves. In such case, malware first infects a user's PC, and then it modifies the user's browser (through patching) so that the malware is able to read user data and modify it.

Another consideration is that, oftentimes, the same function/API is patched by several "players"—some of which may be legitimate, and some not.

It should be stressed that patching techniques have been widely known for decades, and are applicable to a vast array of operating systems and architectures. For simplicity, for illustrative purposes and without loss of generality, the below text describes patching for Windows 32 bit architecture (Win32), but the invention is applicable to many other platforms and architectures.

There are several well-known ways in which patching can be applied:

EAT patching: the original function address in the export table (of the exporting module) is replaced with an address for the surrogate function (which may, or may not call the original function). Any module that imports this module after patching is affected.

IAT patching: the original function address in the import table (of the importing module) is replaced with an address for the surrogate function (which may, or may not call the original function). Only the module whose IAT is modified is affected.

In-line patching: a branching instruction is written in the beginning of the function code (the original code is first saved). The target of the branching instruction is the surrogate function. The surrogate function may return control to the caller, or execute the saved instructions and branch back to the original function.

There are benefits and drawbacks to each patching method, which would not be discussed herein in detail for the sake of brevity and which are well known to the skilled person.

SUMMARY OF THE INVENTION

The invention is directed to a method for preventing malicious attacks on software, using the patching method, comprising the steps of:
i) providing a database of legitimate and known patches, which database contains characteristic code paths of said legitimate patches;
ii) detecting whether a patch is malicious by inspecting one or more characteristic paths of said patch and matching said one or more code paths against said database of legitimate and known patches; and
iii) making changes to said malicious patch to prevent it from performing undesired activities, or deleting it.

The term "characteristic code path" is meant to indicate any code sequence that can be used as a "fingerprint" to determine the identity of the patch. Such determination must not necessarily be made with absolute certainty in all cases, and situations may arise in which the determination will be made on the basis of reasonable likelihood. It should be noted that the characteristic code path is not merely a concrete sequence of machine code/instructions. Rather, it can often be a complex pattern that needs to be matched. For example: ADD instruction, with two registers, followed by up to 3 instructions, followed by a JMP instruction to the target register of the ADD instruction.

This is the reason why, as described above, a virtual machine is a suitable implementation—because each virtual machine describes a pattern.

Running the actual data encountered in the field through the machine yields either a match (with the additional output that describe how to linearize the code), or a non-match.

The characteristic code path inspected can be selected from different option and may include, for instance and without limitation, the pointer to the function in the EAT (Export Address Table), or the pointer to the function in the IAT of the currently loaded modules, or the code of the function itself.

In one embodiment, the method of the invention comprises providing in the database also information regarding where to look for the next patch.

In another embodiment, the method of the invention comprises providing the database also information on how to "linearize" the code being examined.

In a further embodiment of the invention the process is repeated until no match is found in the database.

In an alternative embodiment of the invention the process further comprises detecting a malicious patch and correcting it by making appropriate changes to it, or deleting it.

The invention, which will be described in detail below, can be used with any software, but the obvious use-case is a browser software. The software may load with many libraries (e.g. DLLs), of which some may require the described protection method. The protection may be applied to all or some of the functions exported by such libraries.

Thus, for example, if malware patches the function HttpSendResuestA (which resides in the module WinInet.dll), when it is used in Microsoft Internet Explorer (web browser), the malware will be able to monitor all user navigations. A protection may thus be desired for this function, which will remove (or at least detect) the malware patch and thus render the malware ineffective.

The invention can be used to detect and/or prevent patching to (partial list):
- Functions and code inside programs, libraries, DLLs, etc.
- COM objects and other objects, which have virtual function tables
- System objects that have pointers to other objects/functions, such as Windows procedures The invention can be applied to memory (runtime) patching, as well as for disk (or other storage) patching.

DETAILED DESCRIPTION OF THE INVENTION

The method of invention operates by monitoring a set of data items (pointers, code) that determine the identity of a function invoked. Each such data item is evaluated. It may be, for instance, part of a chain of legitimate patching, followed by one or more non-legitimate patchings, or by the original function. If an unknown (non-legitimate) patch is detected, it can be reported, and/or fixed. When fixing is required, the original data items are simply restored from a genuine copy maintained according to the invention.

EXAMPLE

The method of the invention will now be illustrated in the following use case of memory patching. It will be demonstrated on a single function, but it should be obvious that any number of functions can be thus monitored and/or protected.

The software that implements the method of the invention will be referred to hereinafter as "PatchSentry", for the sake of simplicity. PatchSentry consists of several components, and its mode of operation is as follows:

Triggering an inspection are, in this particular example, one or more of the following partial list:
- Periodic timeout
- Activity such as DLL load/unload
- Activity such as thread start/exit
- Invocation of a function, e.g. invocation of GetProcAddress.

When an inspection is triggered, PatchSentry finds the action required (which can be a function of the monitored function identity, the triggering event, or other factors). An action can be e.g. "report" or "fix", though other defining combinations and other actions can be devised as well, as will be apparent to the skilled person.

To first detect whether a malicious patch is present, there are 3 "code paths" inspected:
- The pointer to the function in the EAT (Export Address Table)
- The pointer to the function in the IAT of the currently loaded modules
- The code of the function itself.

Each code path is matched against a database of legitimate and known patches. If a match is found, the database also provides information regarding where to look for the next patch (this is important so that PatchSentry can handle a chain of patches), as well as how to "linearize" the underlying code (as explained further below).

The handling of a chain of patches will be explained by way of an illustrative example. Assuming that a user has an anti-virus and the Google toolbar installed, both which patch some function X, wherein the anti-virus is the first to patch. The execution path would be as follows: First the Google toolbar (since it patched last, i.e. is at the top of the queue), then the anti-virus, and finally the original function code.

In this example PatchSentry is installed and has both Google Toolbar and the particular anti-virus in its database. Then the following events take place:

1) PatchSentry inspects function X. It detects that it's patched. It detects that the patch is Google Toolbar because it matches the Google Toolbar patching style (this is an assumption that PatchSentry makes, which is that it can determine the "owner" of the patch by its patching style. In practical systems this assumption holds true in most cases).
2) The "signature" of Google Toolbar that PatchSentry has in this example contains more than just information on how to detect the patching style of Google Toolbar—it also contains information that enables PatchSentry to virtually reconstruct the underlying function code, as if Google Toolbar never patched the function. Armed with this information, PatchSentry now inspects the function, and detects another patch.
3) PatchSentry now consults its database and matches this newly-found patch to the pattern defined for the particular anti-virus. And again PatchSentry "peels off" this patch to reveal the underlying function code.
4) Since the anti-virus is the bottom-most patch, there are no further patches. Therefore, PatchSentry detects that the function code is now identical to the original function (the one that can be found in the DLL image on disk).

The result of the process described above is that PatchSentry now knows the chain of patches, which is: Google Toolbar->anti-virus->original function.

As explained above, the process depends on PatchSentry having a signature for all legitimate patches it will encounter in the field, in this case—Google Toolbar and the anti-virus. Any unknown patch is treated as malicious, and is removed. If this patch is indeed malicious, then PatchSentry has accomplished the desired result. If this patch belongs to a legitimate, yet un-signed product (un-signed in the sense that PatchSentry does not have a signature for it), then the product's functionality will be maimed.

This process is repeated until no match is found in the database. That is, the underlying code is either the original function, or an unknown (malicious) patch. PatchSentry then compares the underlying code to its own copy of the original function prefix, and if the code matches, then the chain of patches ends with the original function and no malicious patch is found.

If there's no match, then the underlying code represents a malicious patch. In "report" mode, this code is then reported.

In "fix" mode (which is one of the modes of operation of the methods of the invention), the IAT pointer, EAT pointer and code prefix are restored to their original values. Of course, another strategy can be, for example, to undo the malicious patch so that the original chain remains intact. The following example will illustrate these strategies.

Assume the following chain:
  Google Toolbar-> anti-virus->malware->original function
The first strategy is to drop the whole chain, so that the resulting situation is as follows:
  original function
Whereas the second strategy is to carve out the malware patch, so that the resulting situation would be:
  Google Toolbar-> anti-virus->original function
Naturally the second strategy is better (because Google Toolbar and the anti-virus continue to function as usual), but technically it's much harder to accomplish. Since for practical purposes the first solution is acceptable and more easily performed, the invention will often opt to adopt it as the chosen solution in "fix mode".

As will be apparent to the skilled person, the process of matching a given code path to a database of known signatures can be implemented in various ways. One implementation particularly suited for this task is to have the database contain "virtual machines" describing each known patch. The process of matching becomes running each virtual machine with the code path as input. The virtual machine's output can be a binary decision (does the code path given match the patch the virtual machine describes) and properties of the underlying code, if a match is found. These properties can be, for example, the address of the next patch, and instructions for linearization of the underlying code.

It should be understood that the need for linearization stems from a common patching technique called "trampoline". In this technique, patching the function code is done by copying the first few instructions in the function body into a buffer, followed by a branch back to the location in the original function just after those instructions. Then the first few instructions are overwritten with a branch to the surrogate function. Thus, when the function is called, execution is immediately transferred to the surrogate function, which runs its own code. If it needs to transfer execution back to the original function, it simply branches to the buffer, which executes the first few instructions in the original function and branches into it for continuation.

When such patch is encountered, the underlying code is now non-linear. In order to inspect the underlying code, it should undergo "linearization", that is, it should be presented as a continuous code, although its memory layout is not continuous (its first part is in the buffer, and its second part is an offset into the original location). When the VM (above) matches a patch (which is known to use the trampoline technique), it needs to provide its caller with instruction re how to "linearize" the underlying code, e.g. where to pick from the various parts of the code and how to assemble them together so that they represent the linear version of the underlying code.

In "fix mode", when replacing the function's code prefix, care should be taken to avoid a situation in which execution occurs in the code region that is being overwritten. One approach to doing so in the Win32 environment is by first replacing the first byte of the fixed function with a privileged instruction and registering a vectored exception handler that detects attempts to execute this instruction; when an attempt to execute the instruction is detected, it is stalled until the replacement operation completes. The code replacement, on the other hand, is first done for code bytes following the first byte, and only then is the first byte overwritten (followed by removing the vectored exception handler registration).

All the above description has been given for the purpose of illustration and is not meant to limit the invention in any way, except as defined in the claims to follow.

The invention claimed is:

1. A method for preventing malicious attacks on software using a patching method, comprising the steps of:
   a) providing a database of legitimate and known patches, which database contains characteristic code paths of said legitimate patches;
   b) detecting whether a first inspected patch is malicious by inspecting one or more characteristic code paths of said first inspected patch and matching said one or more characteristic code paths of said first inspected patch against said database of legitimate and known patches;
   c) if a mismatch is found, determining whether said first inspected patch is a malicious patch and performing an activity needed to prevent said malicious patch from performing undesired activities by correcting or removing said malicious patch;
   d) obtaining information from said database regarding where to search for a next inspected patch; and
   e) repeating steps a) to d) until no match is found in said database.

2. A method according to claim 1, wherein performing an activity needed to prevent said malicious patch from performing undesired activities comprises making changes to said malicious patch to prevent said malicious patch from performing undesired activities, or deleting said malicious patch.

3. A method according to claim 1, wherein the characteristic code path inspected includes a pointer to a function in an Export Address Table (EAT).

4. A method according to claim 1, wherein the characteristic code path inspected includes a pointer to a function in an Import Address Table (IAT) of currently loaded modules.

5. A method according to claim 1, wherein the characteristic code path inspected includes a code of a function.

6. A method according to claim 1, comprising providing in the database also information regarding where to look for the next patch.

7. A method according to claim 1, further comprising providing in the database information on how to represent the code being examined as a continuous code.

8. The method according to claim 1, wherein the software is a browser.

9. A method according to claim 1, wherein performing an activity needed to prevent said malicious patch from performing undesired activities comprises reporting the presence of the malicious patch to a receiving entity.

10. A method according to claim 9, wherein said receiving entity is selected from one or more of a remote software agent, a local software agent, or a user.

* * * * *